(12) United States Patent
Kapoor et al.

(10) Patent No.: US 9,881,055 B1
(45) Date of Patent: Jan. 30, 2018

(54) LANGUAGE CONVERSION BASED ON S-EXPRESSION TABULAR STRUCTURE

(71) Applicant: Numerify, Inc., Cupertino, CA (US)

(72) Inventors: Rahul Kapoor, Sunnyvale, CA (US); Sunny Tulsi Sreedhar Murthy, Bangalore (IN)

(73) Assignee: Numerify, Inc., San Jose, CA (US)

( * ) Notice: Subject to any disclaimer, the term of this patent is extended or adjusted under 35 U.S.C. 154(b) by 367 days.

(21) Appl. No.: 14/882,207

(22) Filed: Oct. 13, 2015

(51) Int. Cl.
*G06F 17/30* (2006.01)

(52) U.S. Cl.
CPC .. *G06F 17/30427* (2013.01); *G06F 17/30292* (2013.01); *G06F 17/30327* (2013.01)

(58) Field of Classification Search
CPC ......... G06F 17/30569; G06F 17/30427; G06F 17/3043; G06F 17/30292
See application file for complete search history.

(56) References Cited

U.S. PATENT DOCUMENTS

| | | | |
|---|---|---|---|
| 7,987,159 | B2 | 7/2011 | Gopal et al. |
| 9,280,332 | B2 * | 3/2016 | Koseki ...................... G06F 8/51 |
| 2007/0038985 | A1 * | 2/2007 | Meijer ...................... G06F 8/51 717/137 |

OTHER PUBLICATIONS

GSP General SQL Parser Professional SQL engine for various databases, "Parsing, formatting, modification and analysis", SQL Parsel, Analyze, Transform and Format All in One, pp. 1-2, printed Nov. 20, 2015, URL: http://sqlparser.com. Gudu Software 2002-2015.
Microsoft Corporation, "Language Integrated Query" (.NET Framework) from Wikipedia, the free encyclopedia, pp. 1-9, printed Nov. 20, 2015, URL: https://en.wikipedia.org/w/index.php?title=Language_Integrated_Query&oldid=672255809. Released Nov. 19, 2007; Last modified Jul. 20, 2015.
Rosenberg, Kevin M., "CLSQL" from Wikipedia, the free encyclopedia, 1 page, printed Nov. 20, 2015, URL: https://en.wikipedia.org/w/index.php?title=CLSQL&oldid=659923182. Created in 2001; Released Mar. 30, 2015; Last modified Apr. 29, 2015.

* cited by examiner

*Primary Examiner* — Angelica Ruiz
(74) *Attorney, Agent, or Firm* — Rahman LLC

(57) ABSTRACT

Approaches for S-expression tabular structure based language conversion. An SQL expression is converted into an S-expression tabular structure. A function table including a plurality of functions associated with S-expression tabular structure tabulated against at least one of a function name, a derived column and a derived table and an argument table including plurality of arguments associated with the S-expression tabular structure tabulated against at least one of an argument type, a function identifier linking the arguments to the function table, a computed from function, a reference to entity or a literal value, is generated based on the S-expression tabular structure. One or more functions associated with the S-expression tabular structure is converted to a pre-determined SQL based language, based on a language map of the pre-determined language and the function table and the argument table.

20 Claims, 9 Drawing Sheets

| ITEM | L0 | L1 | L2 | L3 | L4 | L5 |
|---|---|---|---|---|---|---|
| 1. | AS | | | | | |
| 2. | | SELECT | | | | |
| 3. | | | AS | | | |
| 4. | | | | EXPRESSION FUNCTIONS EX. SUM, MULT, SQRT... | | |
| 5. | | | | | AS ( RECURSIVE LIKE ITEM 3) | |
| 6. | | FROM | | | | |
| 7. | | | AS (RECURSIVE LIKE ITEM 1 AS NESTED TABLES ARE DEFINED USING SELECT, FROM, WHERE ) | | | |
| 8. | | | JOIN | | | |
| 9. | | WHERE | | | | |
| 10. | | | AND | | | |
| 11. | | | OR | | | |
| 12. | | | | CONDITIONALS EX.> < >= <= = | | |
| 13. | | | | | EXPRESSION AS IN ITEM 4 | |
| 14. | | | | | | AS ( RECURSIVE LIKE ITEM 3) |
| 15. | | GROUP BY | | | | |
| 16. | | HAVING | | | | |
| 17. | | | AND | | | |
| 18. | | | OR | | | |
| 19. | | | | CONDITIONALS EX.> < >= <= = | | |
| 20. | | | | | EXPRESSION AS IN ITEM 4 | |
| 21. | | | | | | AS ( RECURSIVE LIKE ITEM 3) |

FIG.2

| ID  | FUNCTION NAME | DERIVED COLUMN | DERIVED TABLE |
|-----|---------------|----------------|---------------|
| F1  | AS            |                | T             |
| F2  | SELECT        |                | T             |
| F3  | AS            | R              |               |
| F4  | MULT          | R              |               |
| F5  | AS            | X'             |               |
| F6  | SUM           | X'             |               |
| F7  | SQRT          | X'             |               |
| F8  | FROM          |                | T             |
| F9  | JOIN          |                | T             |
| F10 | AS            |                | T2            |
| F11 | SELECT        |                | T2            |
| F12 | AS            | T2.X           |               |
| F13 | AS            | Z              |               |
| F14 | SUM           | Z              |               |
| F15 | AS            | T2.P           |               |
| F16 | SQUARE        | T2.P           |               |
| F17 | FROM          |                | T2            |
| F18 | JOIN          |                | T2            |
| F19 | WHERE         |                | T2            |
| F20 | WHERE         |                | T             |

302 — ID; 304 — FUNCTION NAME; 306 — DERIVED COLUMN; 308 — DERIVED TABLE

FIG.3A

| ID | TYPE | FUNCTION ID | COMPUTED FROM FUNCTION | REFERENCE TO ENTITY | LITERAL VALUE |
|---|---|---|---|---|---|
| A1 | DERIVED TABLE | F1 | | T | |
| A2 | COMPUTED | F1 | F2 | | |
| A3 | COMPUTED | F1 | F8 | | |
| A4 | COMPUTED | F1 | F20 | | |
| A5 | COMPUTED | F2 | F3 | | |
| A6 | COMPUTED | F2 | F5 | | |
| A7 | DERIVED COLUMN | F3 | | R | |
| A8 | COMPUTED | F3 | F4 | | |
| A9 | DERIVED COLUMN | F4 | | T2.P | |
| A10 | BASE COLUMN | F4 | | T1.Q | |
| A11 | DERIVED COLUMN | F5 | | X' | |
| A12 | COMPUTED | F5 | F6 | | |
| A13 | LITERAL | F6 | | | 1 |
| A14 | COMPUTED | F6 | F7 | | |
| A15 | DERIVED COLUMN | F7 | | T2.X | |
| A16 | COMPUTED | F8 | F9 | | |
| A17 | BASE TABLE | F9 | | T1 | |
| A18 | COMPUTED | F9 | F10 | | |
| A19 | DERIVED TABLE | F10 | | T2 | |
| A20 | COMPUTED | F10 | F11 | | |
| A21 | COMPUTED | F10 | F17 | | |

FIG.3B

| | 314 | 316 | 318 | 320 | 322 | 324 |
|---|---|---|---|---|---|---|
| ID | TYPE | FUNCTION ID | COMPUTED FROM FUNCTION | REFERENCE TO ENTITY | LITERAL VALUE |
| A22 | COMPUTED | F10 | F19 | | |
| A23 | COMPUTED | F11 | F12 | | |
| A24 | COMPUTED | F11 | F13 | | |
| A25 | COMPUTED | F11 | F15 | | |
| A26 | DERIVED COLUMN | F12 | | T2.X | |
| A27 | BASE COLUMN | F12 | | T3.X | |
| A28 | DERIVED COLUMN | F13 | | Z | |
| A29 | COMPUTED | F13 | F14 | | |
| A30 | BASE COLUMN | F14 | | T3.X | |
| A31 | BASE COLUMN | F14 | | T4.Y | |
| A32 | DERIVED COLUMN | F15 | | T2.P | |
| A33 | COMPUTED | F15 | F16 | | |
| A34 | DERIVED COLUMN | F16 | | Z | |
| A35 | COMPUTED | F17 | F18 | | |
| A36 | BASE TABLE | F18 | | T3 | |
| A37 | BASE TABLE | F18 | | T4 | |
| A38 | COMPUTED | F19 | T3-T4 JOIN COND. | | |
| A39 | COMPUTED | F20 | T1-T2 JOIN COND. | | |

FIG.3C

| S-EXPRESSION LANGUAGE | TARGET LANGUAGE |
|---|---|
| (FN1 NAME A1, A2, A3) -- TARGET HAS DIFFERENT ORDER | FN1 NAME (A3, A2, A1) -- REVERSE ARGUMENT ORDER |
| (FN2 NAME A1, A2) -- TARGET HAS MORE ARGUMENTS | FN2 NAME (A1, A2, A3) -- SUPPLY DEFAULT VALUE FOR 3 |
| (FN3 NAME A1, A2, A3) -- TARGET HAS FEWER ARGUMENTS | FN3 NAME (A1, A2) -- DROP ARGUMENT 3 |
| (FN4 NAME A1, A2) -- TARGET HAS FN NAME TRANSPOSED | A1 FN4 NAME A2 -- DROP,(AND) |
| (FN5 NAME A1) -- TARGET HAS DIFFERENT FN NAME | FN5 NEW NAME (A1) -- CHANGE NAME |

FIG.4A

| S-EXPRESSION LANGUAGE 406 | TARGET LANGUAGE 408 |
|---|---|
| (FN NAME A1, A2, A3) -- TARGET HAS DIFFERENT OPENING AND CLOSING PARENTHESIS AND SEPARATORS | FN NAME {A1;A2;A3} -- USE {} AND ; |
| (FN ORIG NAME A1) -- TARGET HAS DIFFERENT FN NAME | FN DIFFERENT NAME {A1} -- CHANGE NAME |

FIG.4B

| S-EXPRESSION LANGUAGE 410 | TARGET LANGUAGE 412 |
|---|---|
| (AS LABEL ARG) | ARG AS LABEL |
| (AS LABEL ARG1 ARG2 ARG3 ...) | (ARG1 ARG2 ARG3 ...) AS LABEL |
| (SELECT ARG1 ... ARGN) | SELECT ARG1, ..., ARGN |
| (FROM ARG1 ... ARGN) | FROM ARG1, ..., ARGN |
| (JOIN ARG1 ARG2) | ARG1 JOIN ARG2 |
| (WHERE ARG) | WHERE ARG |
| (AND ARG1 ARG2) | ARG1 AND ARG2 |
| (OR ARG1 ARG2) | ARG1 OR ARG2 |
| (MIN ARG1 ARG2...) | MIN (ARG1, ARG2, ...) |
| (MAX ARG1 ARG2...) | MAX (ARG1, ARG2, ...) |
| (AVG ARG1 ARG2...) | AVG (ARG1, ARG2, ...) |
| (SUM ARG1 ARG2...) | SUM (ARG1, ARG2, ...) |
| (SQRT ARG1) | SQUAREROOT (ARG1) |
| ... | ... |

FIG.4C

LANGUAGE CONVERSION BASED ON S-EXPRESSION TABULAR STRUCTURE

RELATED APPLICATION DATA

This application is related to U.S. non-provisional patent application Ser. No. 14/882,202, filed Oct. 13, 2015, entitled "S-EXPRESSION BASED COMPUTATION OF LINEAGE AND CHANGE IMPACT ANALYSIS," the contents of which are hereby incorporated by reference for all purposes as if fully set forth herein.

BACKGROUND

Technical Field

The embodiments herein generally relate to database management systems, and, more particularly, to approaches for language conversion based on S-expression tabular structure.

Description of the Related Art

Pursuant to an exemplary scenario, a relational database is a collection of related data organized in related two-dimensional tables of columns and rows such that information can be derived by performing set operations on the tables, such as join, sort, merge, and so on. A relational database typically includes multiple tables. A table may have several records and at least one field within each record. A record could include a row in the table that is identified by a unique record identifier. Database management system (DBMS), and in particular a relational database management system (RDBMS) is a control system that supports database features including, but not limited to, storing data on a memory medium, retrieving data from the memory medium and updating data on the memory medium.

Typically data stored in a relational database is accessed using a query constructed in a query language such as Structured Query Language ("SOL"). A SQL query is non-procedural in that it species the objective or desired result of the query in a language meaningful to a user but does not define the steps to be performed, or the order of the steps in order to accomplish the query. Large conventional database systems provide a storehouse for data generated from a variety of locations and applications (often referred to as data ware houses or data marts).

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

A number of systems, processor-implemented methods, and non-transitory computer-readable mediums for S-expression tabular structure based language conversion is disclosed.

In one aspect, a non-transitory computer-readable medium carrying one or more sequences of instructions which, when executed by one or more processors, cause the one or more processors to execute a method of converting SQL expression into an S-expression tabular structure, where the S-expression tabular structure models a nested list. In an embodiment, the method includes generating a function table based on the S-expression tabular structure, where the function table includes a plurality of functions associated with the S-expression tabular structure tabulated against at least one of a function name, a derived column and a derived table. In an embodiment, an argument table is generated based on the S-expression tabular structure, where the argument table includes a plurality of arguments associated with the S-expression tabular structure tabulated against an argument type, a function identification, a computed from function, a reference to entity and/or a literal value. In an embodiment, a function associated with the S-expression tabular structure is converted to a pre-determined language, based on a language map of the pre-determined language and the function table and the argument table.

In another aspect, a system for S-expression tabular structure based language conversion is disclosed. The system includes an S-expression tabular structure conversion module, a function table module, an argument table module, and a language conversion module. In an embodiment, the S-expression tabular structure conversion module converts a SQL expression into an S-expression tabular structure, where S-expression tabular structure models a nested list. The function table module generates a function table based on the S-expression tabular structure, where the function table includes a plurality of functions associated with the S expression tabulated against a function name, a derived column and/or a derived table. In an embodiment, the argument table module generates an argument table based on the S-expression tabular structure, where argument table includes a plurality of arguments associated with the S-expression tabular structure tabulated against an argument type, a function identifier linking the arguments to the function table, a computed from function, and/or a reference to entity or a literal value. In an embodiment, a language conversion module converts a function associated with the S-expression tabular structure to a pre-determined language based on a language map of the pre-determined language and the function table and the argument table.

In yet another aspect, a processor-implemented method of S-expression tabular structure based language conversion is disclosed. In an embodiment, the processor-implemented method includes generating a function table based on the S-expression tabular structure, where the function table includes a plurality of functions associated with the S expression tabulated against at least one of a function name, a derived column and a derived table. In an embodiment, an argument table is generated based on the S-expression tabular structure, where the argument table includes a plurality of arguments associated with the S expression tabulated against an argument type, a function identification, a computed from function, a reference to entity and/or a literal value. In an embodiment, a function associated with the S-expression tabular structure is converted to a pre-determined language, based on a language map of the pre-determined language and the function table and the argument table.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2 illustrates an exemplary tabular representation for converting SQL expression to S-expression tabular structure, in accordance with an exemplary scenario;

FIG. 3A depicts an exemplary function table generated using S-expression tabular structure, in accordance with an embodiment;

FIGS. 3B-3C depicts an exemplary argument table generated using S-expression tabular structure, in accordance with an embodiment;

FIGS. 4A-4C depict exemplary language maps, in accordance with an embodiment.

DETAILED DESCRIPTION OF PREFERRED EMBODIMENTS

Figure 1:
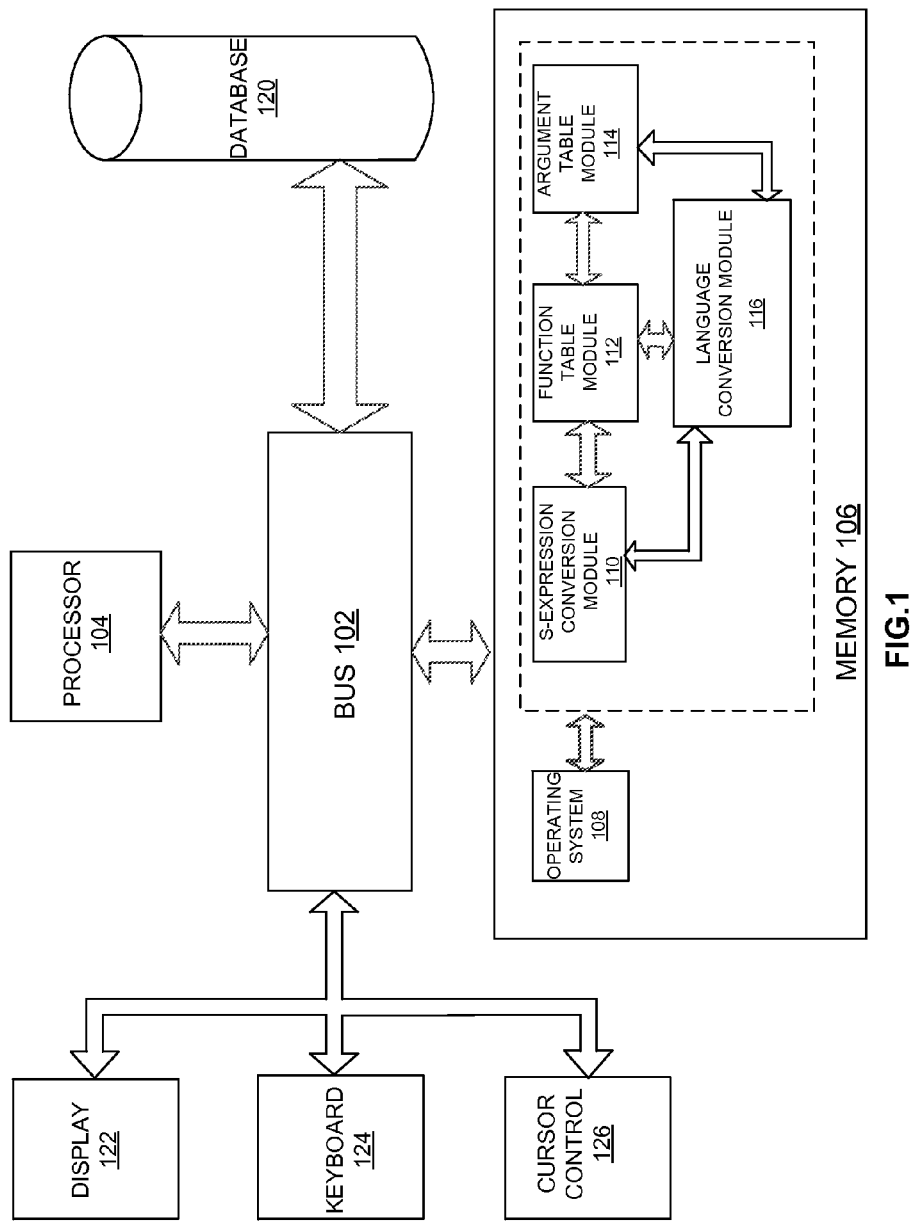
FIG. 1 is a block diagram representing a computer system in which various aspects of the present invention may be incorporated.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Typically in data integration systems, where data from one or more systems is combined to create a master data store or a data warehouse, SQL may be commonly employed to map source models to a target master data store or a warehouse model, and a series of mappings and transformations may be invoked to transform the data as it goes from the source to the destination. Various tools may be required to query the data from the destination master data store or warehouse using a target specification model which describes the destination data. In various scenarios, it may be required to convert SQL expressions to one or more other languages. A business entity may have its own SQL based dimension modeling language but may need to support a variety of business intelligence (BI) tools (such as MicroStrategy) for analytics. Typically, the BI tools have their own modeling language, such as an SQL based language but with customizations. Since analytics on warehouse may be supported via the BI tool, there may be a need to programmatically convert expressions entered in its SQL based modeling language to that of the BI tool. However, disparate metadata repositories across BI tool and extract transform load (ETL) tool and differences in BI Tool languages render the language conversion process complex.

Various embodiments of the systems and processor-implemented methods provided herein enable automatic conversion of SQL expression into S-expression tabular structure for facilitating language conversion based on S-expression tabular structure. In an embodiment, a SQL expression is converted into an S-expression tabular structure. As used herein the term "S-expression" refers to a nested list data structure. In an embodiment, each element of the S-expression may be a list in itself and the "S-expression tabular structure" refers to a function and argument table based representation of the S-expression. A function table and an argument table are generated based on the S-expression tabular structure and a language conversion may be performed using the function and argument tables and S-expression tabular structure.

In an embodiment, the S-expression tabular structure serves as an intermediate format rendering it easy to decompose expressions entered in SQL (algorithm described subsequently) into decomposed tabular representations making it easy to process the expressions and to convert them to a different target language by using language maps. For instance, if SQRT in SQL is called SquareRoot in MicroStrategy BITool it may be saved in the language map, or if in the function syntax "( )" are replaced by "{ }" or, are replaced by ";" the difference may be indicated in the language map. Similarly if the order of arguments for a function in SQL is different from that in a MicroStrategy BI Tool that may be indicated in the language map as well. In several instances, the number of arguments for a function may be different (higher or lower) and needs to be compensated by providing default values for additional arguments or dropping ones that a different language does not need. The processor implemented methods and systems disclosed herein enable the language conversion in the above described scenarios based on S-expression tabular structure.

FIG. 1 is a block diagram representing a computer system in which various aspects of the present invention may be incorporated. In an embodiment, the computer system includes a bus 102, a processor 104, a memory 106 including a plurality of modules and an operating system 108. The processor 104 is operatively coupled to the bus 102. Examples of the processor 104 may include, but is not limited to a general purpose processor, a specific purpose processor, and the like. The memory 106 may include, but is not limited to a random access memory, a read only memory, a static storage such as a magnetic storage or optical disc or any computer-readable medium. The computer-readable medium may include, but is not limited to a volatile medium, a non-volatile medium, a removable medium, a non-removable medium, a storage medium, and the like. Further, the computer readable medium can be any apparatus that can comprise, store, communicate, propagate, or transport the program for use by or in connection with the instruction execution system, apparatus, or device.

The computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, an optical disk, and the like. In an embodiment, the computer system may additionally include a database 120 operatively coupled to the processor 104 and configured to store data including logically related data records, system records, data files and the like. Examples of the database 120 may include, but is not limited to an analytical database, a data warehouse, a distributed database, an external database, a navigational database, a real-time database, an in-memory database, a document oriented database, a relational database, an object oriented database, a data management workbench or any other database known in the art. In an embodiment, the computer system may additionally include a display 122, a keyboard 124, and/or a cursor control device 126.

In an embodiment, the plurality of modules include an S-expression tabular structure conversion module 110, a function table module 112, an argument table module 114, and a language conversion module 116. In an embodiment, one or more of the plurality of modules may be operatively coupled or communicatively associated with one another (indicated by the bi-directional arrows between the modules in FIG. 3). In an embodiment, the S-expression tabular structure conversion module 110 converts a SQL expression into an S-expression tabular structure. The conversion of SQL expression to S-expression tabular structure and using the S-expression tabular structure as an intermediate format is simpler to manipulate and facilitates expression analysis. The S-expression tabular structure conversion module 110 retrieves one or more keywords and one or more arguments associated with the SQL expression and generates a tabular representation of the one or more keywords and the one or more arguments. The tabular representation comprises one or more keywords and one or more arguments arranged at a plurality of levels comprising a lowest outermost level and a highest innermost level. The arrangement at the plurality of levels is based on a level of one or more keywords and one or more arguments in a syntax of the SQL expression.

FIG. 2 illustrates an exemplary tabular representation for converting SQL expression to S-expression tabular structure, in accordance with an embodiment. The tabular representation of FIG. 2 includes a plurality of levels ranging from L0 to L5 (202 to 214) and SQL keywords such as SELECT, FROM, WHERE, GROUP BY, JOIN, AS, AND, OR and HAVING arranged at various levels based on a level of one or more keywords and one or more arguments in a syntax of an SQL expression. The S-expression tabular structure conversion module 110 traverses the tabular representation for grouping one or more arguments subsequent to a keyword at a level and prior to a subsequent keyword at the same level or a subsequent lower level from among the plurality of levels. Each SQL keyword (ex. SELECT, FROM, JOIN, WHERE, etc.) is treated as a function with whatever succeeds as arguments until we hit the next keyword at the same level. The S-expression tabular structure conversion module 110 represents the grouped arguments as arguments of the keyword nested within a pair of parenthesis following the keyword. In an embodiment, the keyword is represented as a function with the one or more arguments, and upon the subsequent keyword being at the subsequent lower level, the keyword along with the nested arguments of the level are nested within another pair of parenthesis. In other words, the function arguments are nested functions with their own arguments and are processed in a way such that everything following the argument function name until the next keyword at the same or lower numbered level is an argument to the sub function. If a lower numbered level is reached then not only the argument function but the parent function as well is closed with a parenthesis. In an embodiment, prior to converting SQL expression to the tabular representation by relying on keyword leveling, a standard SQL parsing techniques may be used to parse SQL into a tree or in-memory objects to facilitate manipulation. Consider for example, an SQL expression (1):

(SELECT MULT (T2.P,T1.Q) as R,SUM(1,SQRT (T2.X)) as X'

From T1 JOIN (SELECT T3.X as X,SUM(T3.X,T4.Y) as Z,SQUARE(Z) as P FROM T3 JOIN T4 WHERE T3-T4 join condition) as T2

Where T1-T2 join condition) as T             (1)

The above SQL expression (1) may be converted into the following S-expression string (2) based on the above described technique:

(AS T(SELECT(AS R(MULT T2.P T1.Q))(AS X'(SUM 1(SART T2.X))))

(FROM(JOIN T1(AS T2(SELECT(AS T2.X T3.X) (AS Z(SUM T3.X T4.Y))(AS T2.P(SQUARE Z)))

(FROM(JOIN T3 T4))

(WHERE T3-T4 join condition)

)

)

)

(WHERE T1-T2 join condition))

)             (2)

In the S-expression string (for example the one above), the whole expression is considered a list where every element in the list could itself be a list. So for example AS is the first element in the list and its argument is the alias T, and the SELECT, FROM, WHERE statements which are lists in themselves. In an embodiment, the S-expression tabular structures could be represented as an n-ary tree, where the first element in the list is the root and the following elements are its children, where the children themselves could be trees. A pre-order walk of the tree would give the original S-expression string.

In an embodiment, the function table module 112 generates a function table based on the S-expression tabular structure. The function table includes a plurality of functions associated with the S-expression tabular structure tabulated against at least one of a function name, a derived column and a derived table. An example of the function table for the S-expression tabular structure (2) described above is illustrated in FIG. 3A. As illustrated in FIG. 3A, in the function table a plurality of functions with function identification (ids) are listed in the first column 302 and the corresponding function names such as AS, SELECT, MULT, SUM SQRT and the like corresponding to each of the functions F1 to F20 are listed in the column 'Function Name' 304. In an embodiment, the corresponding derived column for each function is listed in the 'Derived Column' 306 and the corresponding derived table for each function is listed in the 'Derived Table' Column 308.

In an embodiment, the argument table module 114 generates an argument table based on the S-expression tabular structure. The argument table includes a plurality of arguments associated with the S-expression tabular structure tabulated against at least one of an argument type, a function identifier linking the arguments to the function table, a computed from function, a reference to entity or a literal value. An example of the argument table for the S-expression tabular structure (2) described above is illustrated in FIGS. 3B-3C. As illustrated in the argument table of FIGS. 3B-3C, a plurality of arguments associated with the S-expression tabular structure (such as A1-A39) are listed in the first column 314 and argument types such as 'Derived Table', 'Computed', 'Derived Column', 'Base Table', 'Base Column', 'Literal' and the like are listed in the 'Type' column 316 against the corresponding argument. Similarly function identifiers (F1 to F20) are listed along the 'Function id' column 318 for linking the arguments to the function table and the corresponding computed from functions are listed in the 'Computed From Function' column 320. Also, reference to entity or a literal value corresponding to each of the arguments is listed along 'Reference to entity' column 322 and 'literal value' column 324 respectively. Since each function may have many arguments the relationship between the function table and the argument table are one to many.

In an embodiment, in the S-expression tabular structure notation, the first element following '(' is the function name and everything following till ')' are arguments to the function. So the first function AS is added to the function table with id "F1". The first argument to the AS function is the name of the Derived Table T which is a reference to an entity. The second, third and fourth arguments are SELECT, FROM and WHERE which are functions themselves and hence Computed. A function like MULT (F4) has both a Base Column T1.Q and a Derived Column T2.P as arguments. An argument which is not a function or a metadata entity is treated as a Literal, for example 1 which is an argument (A13) to SUM (F6). In an embodiment, functions may produce a Derived Column, if not the closest Derived Column it contributes to are listed. For example, SQRT (F7) is notated as producing X' (alternately we could mandate an AS with each sub-function). Other functions produce a Derived Table for example AS and its arguments SELECT, FROM, WHERE.

The language conversion module 116 converts one or more functions associated with an S-expression tabular structure to a pre-determined language based on a language map of the pre-determined language and using the function table and the argument table. In an embodiment, the pre-determined language may include a SQL based language. In another embodiment, the pre-determined language may include a non-SQL language. In an embodiment, the language conversion module performs the conversion by reconstructing an S-expression string for one or more function from a database representation and transforming the reconstructed S-expression string for the functions to the pre-determined language.

In an embodiment, S-expression tabular structure conversion module 110 converts an SQL expression associated with a definition of a dimensional model to an S-expression string and the language conversion module 116 converts the S-expression string into an expression associated with a dimensional model of a predetermined business intelligence tool through the process as described above.

In an embodiment, reconstructing involves a) selecting a function name of the function from the language map and selecting an argument type, a reference to entity, a literal value, and/or a computed from function for the one function from the argument table, b) augmenting the S-expression string for the function with the argument type comprising a base column, a derived column, a base table, and/or a derived table along with the reference to entity, c) augmenting the S-expression string for the function with the argument type comprising a literal value, and d) recursively performing steps a) to d) on the argument type being a computed function. FIGS. 4A-4C illustrate example language maps including the S-expression tabular structure language (such as, 402, 406, 410) tabulated against the corresponding target language translations (such as, 404, 408, 412). For instance in FIG. 4A, for a function with function name FN1, arguments are of order A1, A2, A3 and for the same function in the target language the order of arguments could be in reverse order such as A3, A2, A1 as illustrated in the first row of the table of FIG. 4A.

In an embodiment, the language maps may be used for obtaining the name of a function/keyword in the target language if different from SQL based function names or SQL keywords, for example, Square Root instead of SQRT. In an embodiment, the language maps may also be used for determining an order of function and argument, for example, (AND Arg1 Arg2) in S-expression tabular structure notation would be Arg1 AND Arg2 in the pre-determined language. In an embodiment, language maps may also be used for determining function argument separators, for instance SQL uses ',' for grouping function arguments (as for MIN, MAX, SUM) but not after language keywords (like SELECT, FROM, WHERE, JOIN). In an embodiment, the language maps may also be used for determining the function argument grouping syntax, for instance SQL uses '(' and ')' for grouping function arguments (as for MIN, MAX, SUM) but not after language keywords (like SELECT, FROM, WHERE, JOIN) and for obtaining the number of function arguments. In several instances fewer arguments, or additional arguments with default values may need to be included while converting to target language.

In an embodiment, the language conversion module 116 transforms the reconstructed S-expression string to the pre-determined language by changing one or more function names, one or more arguments, a syntax and/or one or more keywords of each list in the reconstructed S-expression string to be in compliance with the language map of the pre-determined language. In an embodiment, in order to transform, the language conversion module 116 changes an order of one or more function names and one or more arguments in the reconstructed S-expression string to that in the pre-determined language. For example, as illustrated in the first row of the table of FIG. 4A, an order of arguments A1, A2, A3 of a function FN1 is changed to an order A3, A2, A1 for the same function in the target (pre-determined) language. In an embodiment, in order to transform, the language conversion module 116 changes a syntax in the S-expression string based on the language map by changing or removing one or more argument separators and/or one or more function boundary identifiers. For example, a syntax in the S-expression string (FN NAME A1, A2, A3) may be changed to a corresponding syntax FN NAME {A1;A2;A3} in the target (pre-determined) language as illustrated in the first row of the table of FIG. 4B. In an embodiment, one or more function names, one or more arguments, and/or one or more keywords may be dropped or removed while transforming the S-expression string into the pre-determined language. An example code for reconstructing S-expression string and transforming the reconstructed S-expression string into the pre-determined language based on language map illustrated in FIG. 4C is as follows:

```
ConvertFunctionToTarget (Input Function Id, Input Language Map L, Output Expression E)
{
    /* 2 step approach—reconstruct S-expression string
       first and then transform to SQL like language */
    ConvertFunctionToS-Expr (Id, E)
    /* Convert S-expression string to SQL like language */
```

```
For each List in S-expression string E
{
  Switch (Function Name for List)
  {
    /* Language map 3 is used for
      i)Getting the Function/Keyword Name in the
      target language if different from our SQL based
      Function Names and SQL keywords ex. Square
      Root instead of SQRT
      ii)Getting function and argument order ex.
      (AND Arg1 Arg2) in SQL would be Arg1 AND
      Arg2
      iii)Getting the function argument separator ex.
      SQL uses ',' for grouping function arguments
      (as for MIN, MAX, SUM) but not after lan-
      guage keywords (like SELECT, FROM,
      WHERE, JOIN)
      iv)Getting the function argument grouping syn-
      tax ex. SQL uses '(' and ')' for grouping func-
      tion arguments (as for MIN, MAX, SUM) but
      not after language keywords (like SELECT,
      FROM, WHERE, JOIN)
      v)Getting number of function arguments—
      fewer arguments, or additional arguments with
      default values would need to be handled here */
    Case 'AS':
      Transpose (AS Label Arg) to Arg AS Label /*
      Derived column case */
      Transpose (AS Label Arg1 Arg2 Arg3 . . . ) to
      (Arg1 Arg2 Arg 3. . . ) AS Label /* Derived
      table case */
    Case 'SELECT':
      Transpose (SELECT Arg1 . . . ArgN) to
      SELECT Arg1, . . . , ArgN
    Case 'FROM':
      Transpose (FROM Arg1 . . . ArgN) to FROM
      Arg1, . . . , ArgN
    Case 'JOIN':
      Transpose (JOIN Arg1 Arg2) to Arg1 JOIN
      Arg2
    Case 'WHERE':
      Transpose (WHERE Arg) to WHERE Arg
    Case 'AND'
      Transpose (AND Arg1 Arg2) to Arg1 AND
      Arg2
    Case 'OR'
      Transpose (OR Arg1 Arg2) to Arg1 OR Arg2
    Case 'MIN', MAX, AVG, SUM
      Transpose (FunctionName Arg1 Arg2 . . . ) to
      FunctionName (Arg1, Arg2 . . . )/* SQL func-
      tions */
    Case 'SQRT'
      Transpose (SQRT Arg1) to SquareRoot (Arg1)
      /* Different function name per Language Map
      */
    . . .
      /* Handle many other SQL constructs not
      elaborated on for simplicity */
  }
}
ConvertFunctionToS-Expr (Input Function Id Id, Output
  Expression E)
{
  E=E+'('+Select 'Function Name' from 'Function
  Table' where 'Id'=Id
  For each (Select 'Type' T, 'Reference To Entity' RE,
    'Literal Value' LV, 'Computed From Function' CF
    from 'Argument Table' where 'Function Id'=Id)
  {
    If T=('Base Column' || 'Derived Column' || 'Base
      Table' || 'Derived Table')
      E=E+RE+' '
    If T=('Literal Value')
      E=E+LV+' '
    If T=('Computed')
      ConvertFunctionToS-Expr (CF, E)
  }
  E=E+')'
}
```

Figure 5:
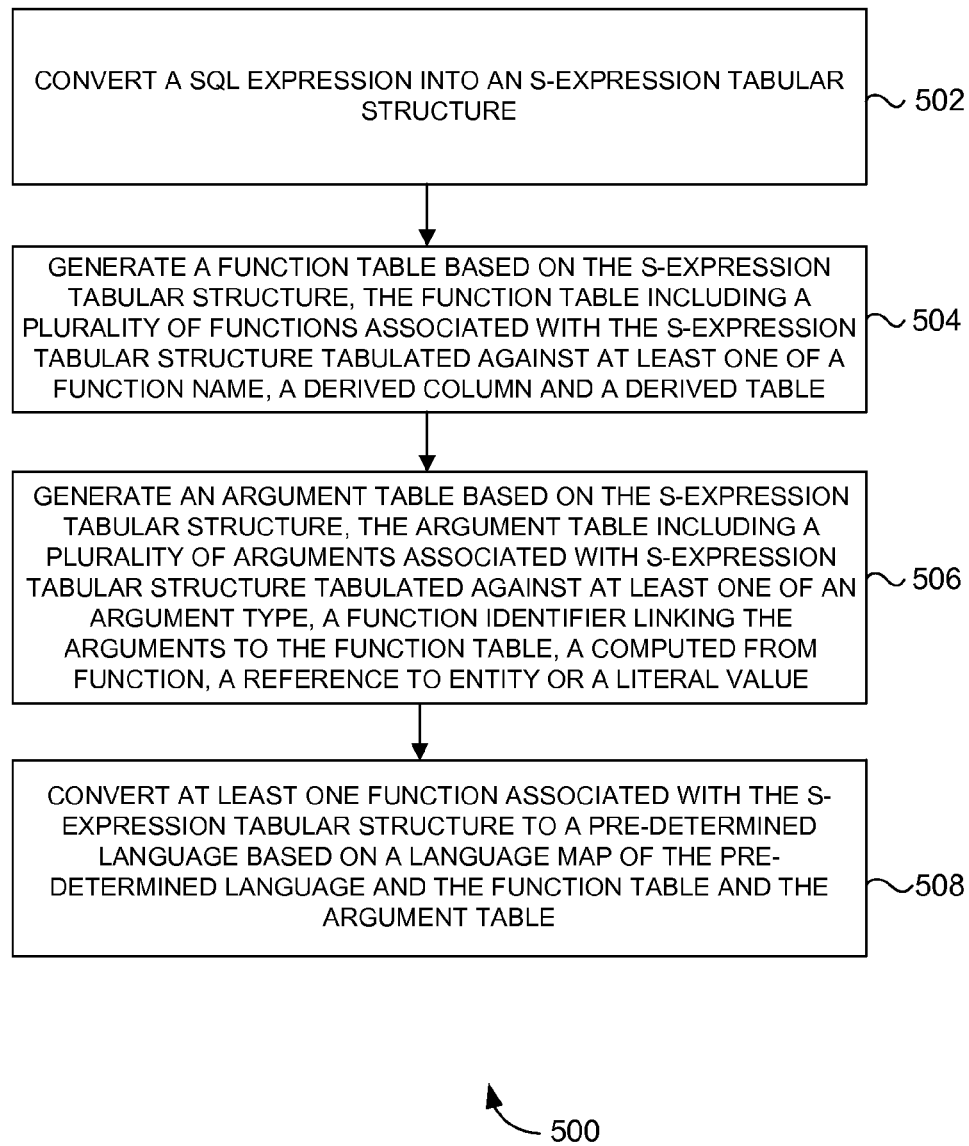
FIG. 5 depicts a flow chart illustrating a processor-implemented method of S-expression tabular structure based language conversion, in accordance with an embodiment.

FIG. 5 depicts a flow chart 500 illustrating a processor-implemented method of language conversion based on S-expression tabular structure, in accordance with an embodiment. In step 502, a SQL expression is converted (for example, using S-expression tabular structure conversion module 110 of FIG. 1) into an S-expression tabular structure. In an embodiment, the S-expression includes a nested list data structure. In an embodiment, each element of the nested list data structure could be a list in itself. The process of conversion of SQL expression into S-expression tabular structure is described in detail along with FIG. 2 and is not repeated here for the sake of brevity. In an embodiment, at step 504, a function table is generated (for example, using a function table module 112 of FIG. 1) based on the S-expression tabular structure. An example of the function table is depicted in FIG. 3A. In an embodiment, the function table includes a plurality of functions associated with the S-expression tabular structure tabulated against at least one of a function name, a derived column and a derived table. At step 506, an argument table is generated based on the S-expression tabular structure, such that the argument table includes a plurality of arguments associated with the S-expression tabular structure tabulated against at least one of an argument type, a function identifier linking the arguments to the function table, a computed from function, a reference to entity or a literal value. An example of the argument table is depicted in FIGS. 3B-3C and described in detail along with the same.

In an embodiment, at step 508, at least one function associated with the S-expression tabular structure is converted to a pre-determined language based on a language map of the pre-determined language and the function table and the argument table (for example using a language conversion module 116 of FIG. 1). In an embodiment, the pre-determined language may include a SQL based language. In an embodiment, converting into pre-determined language includes reconstructing the S-expression string for the function from a database representation and transforming the reconstructed S-expression string for the function to the pre-determined language. In an embodiment, reconstructing the S-expression string involves a) selecting a function name of a function from the function table and selecting an argument type, a reference to entity, a literal value, and/or a computed from function for the function from the argument table, b) augmenting the S-expression string for the function with the argument type including a base column, a derived column, a base table, and/or a derived table along with the reference to entity, c) augmenting the S-expression string for the function with the argument type including a literal value, and d) recursively performing steps a) to d) for the argument type including a computed function.

In an embodiment, transforming the reconstructed S-expression string to the pre-determined language involves changing one or more function names, one or more arguments, a syntax and/or one or more keywords of each list in the reconstructed S-expression string to be in compliance with the language map of the pre-determined language. In an embodiment, in order to transform, an order of one or more function names and one or more arguments is changed in the reconstructed S-expression string to that in the pre-determined language. For example, as illustrated in the first row of the table of FIG. 4A, an order of arguments A1, A2, A3 of a function FN1 is changed to an order A3, A2, A1 for the same function in the target (pre-determined) language. In an embodiment, in order to transform, a syntax is changed in the S-expression string based on the language map by changing or removing one or more argument separators and/or one or more function boundary identifiers. For example, a syntax in the S-expression string (FN NAME A1, A2, A3) is changed to a corresponding syntax FN NAME {A1;A2;A3} in the target (pre-determined) language as illustrated in the first row of the table of FIG. 4B. In an embodiment, one or more function names, one or more arguments, and/or one or more keywords may be dropped or removed while transforming the S-expression string into the pre-determined language. In an embodiment, an SQL expression associated with a definition of a dimensional model may be converted to an S-expression string and the S-expression string is converted into an expression associated with a dimensional model of a predetermined business intelligence tool through the process as described above in FIG. 5.

Various systems and processor-implemented methods and systems disclosed herein auto map SQL expression to S-expression tabular structure for representing those S-expression tabular structure in relational tables for facilitating language conversion. The S-expression tabular structure is easier to programmatically decompose, understand and manipulate expressions and reconstruct expressions back when compared to SQL expression and the systems and methods described herein facilitate easier, automatic and less complex language conversion into a pre-determined language. The systems and processor-implemented methods disclosed herein enable easier conversion of SQL expressions to other SQL like languages leveraging with the ease of manipulating expressions in simple representation and the use of language maps to reconstruct expressions in the SQL like language.

Various processor-implemented methods and systems provided herein facilitate mapping to one or more expression of a business intelligence (BI) tool programmatically using language maps and enables easier and simpler determination of the definition of an expression in the language of BI tool. For example, if measure X' defined as SUM(1, SQRT(X)) is used in MicroStrategy as MX' the system disclosed herein enables determining the linkage MX' to X' and by virtue of the language map and S-expression tabular structure conversion enables determining that MX' would be SUM(1, SquareRoot(X)) in the BI tool (MicroStrategy).

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage mediums storing one or more sequences of instructions, which when executed by one or more processors, causes:
converting a SQL expression into an S-expression tabular structure, wherein said S-expression comprises a nested list;
generating a function table based on said S-expression tabular structure, wherein said function table comprises a plurality of functions associated with said S expression tabular structure tabulated against at least one of a function name, a derived column and a derived table;
generating an argument table based on said S-expression tabular structure, wherein said argument table comprises a plurality of arguments associated with said S expression tabular structure tabulated against at least one of an argument type, a function identification, a computed from function, a reference to entity or a literal value; and converting at least one function associated with said S-expression tabular structure to a pre-determined language, based on a language map of said pre-determined language and said function table and argument table.

2. The one or more non-transitory computer readable storage mediums of claim 1, wherein said converting comprises:

reconstructing an S-expression string for said at least one function from a database representation; and transforming said reconstructed S-expression string for said at least one function to said pre-determined language.

3. The one or more non-transitory computer readable storage mediums of claim 1, wherein said reconstructing comprises:

a) selecting a function name of said at least one function from said function table and selecting at least one of an argument type, a reference to entity, a literal value, a computed from function for said at least one function from said argument table;

b) augmenting an S-expression string for said at least one function with said argument type comprising at least one of a base column, a derived column, a base table, or a derived table along with said reference to entity;

c) augmenting said S-expression string for said at least one function with said argument type comprising a literal value; and d) recursively performing steps a) to d) for said argument type comprising a computed function.

4. The one or more non-transitory computer readable storage mediums of claim 1, wherein said transforming comprises:

changing at least one of one or more function names, one or more arguments, a syntax and one or more keywords of each list in a reconstructed S-expression string to be in compliance with said language map of said pre-determined language.

5. The one or more non-transitory computer readable storage mediums of claim 4, wherein said changing comprises performing at least one of:

changing an order of said one or more function names and one or more arguments in said reconstructed S-expression string; and changing said syntax based on said language map by at least changing or removing at least one or more argument separators and one or more function boundary identifiers.

6. The one or more non-transitory computer readable storage mediums of claim 1, wherein converting said SQL expression into an S-expression tabular structure comprises:

retrieving one or more keywords and one or more arguments associated with said SQL expression;

generating a tabular representation of said one or more keywords and said one or more arguments, wherein said tabular representation comprises said one or more keywords and said one or more arguments arranged at a plurality of levels comprising a lowest outermost level and a highest innermost level, based on a level of said one or more keywords and said one or more arguments in a syntax of said SQL expression; and generating said S-expression tabular structure by traversing said tabular representation and grouping one or more arguments subsequent to a keyword at a level from among said plurality of levels and prior to a subsequent keyword at said level or a subsequent lower level from among said plurality of levels, wherein said grouped one or more arguments are represented as arguments of said keyword nested within a pair of parenthesis following said keyword, wherein said keyword is represented as a function with said one or more arguments, and wherein upon said subsequent keyword being at said subsequent lower level, said keyword along with said nested arguments of said level are nested within another pair of parenthesis.

7. The one or more non-transitory computer readable storage mediums of claim 1, wherein said pre-determined language is an SQL based language.

8. The one or more non-transitory computer readable storage mediums of claim 1, wherein said SQL expression comprises an SQL expression associated a definition of a dimensional model and wherein said pre-determined language comprises an expression associated with a dimensional model of a predetermined business intelligence tool.

9. A system comprising:

a processor; and a non-transitory computer readable storage medium comprising one or more modules executable by said processor, wherein said one or more modules comprises:

an S-expression tabular structure conversion module for converting a SQL expression into an S-expression tabular structure, wherein said S-expression comprises a nested list;

a function table module for generating a function table based on said S-expression tabular structure, wherein said function table comprises a plurality of functions associated with said S-expression tabular structure tabulated against at least one of a function name, a derived column and a derived table;

an argument table module for generating an argument table based on said S-expression tabular structure, wherein said argument table comprises a plurality of arguments associated with said S expression tabular structure tabulated against at least one of an argument type, a function identifier linking the arguments to the function table, a computed from function, a reference to entity or a literal value; and a language conversion module for converting at least one function associated with said S-expression tabular structure to a pre-determined language based on a language map of said pre-determined language and said function table and said argument table.

10. The system of claim 9, wherein said language conversion module is further configured to:

reconstruct an S-expression string for said at least one function from a database representation; and transform said reconstructed S-expression string for said at least one function to said pre-determined SQL based language.

11. The system of claim 9, wherein said language conversion module is configured to:

a) select a function name of said at least one function from said function table and selecting at least one of an argument type, a reference to entity, a literal value, a computed from function for said at least one function from said argument table;

b) augment an S-expression string for said at least one function with said argument type comprising at least one of a base column, a derived column, a base table, or a derived table along with said reference to entity;

c) augment said S-expression string for said at least one function with said argument type comprising a literal value; and d) recursively perform steps a) to d) for said argument type comprising a computed function.

12. The system of claim 9, wherein said language conversion module is configured to:

change at least one of one or more function names, one or more arguments, a syntax and one or more keywords of each list in a reconstructed S-expression string to be in compliance with said language map of said pre-determined language.

13. The system of claim 12, wherein said language conversion module is further configured to perform at least one of:

change an order of said one or more function names and one or more arguments in said reconstructed S-expression string; and change said syntax based on said language map by changing or removing at least one or more argument separators and one or more function boundary identifiers.

14. The system of claim 9, wherein an S-expression tabular structure conversion module is configured to:

retrieve one or more keywords and one or more arguments associated with said SQL expression;

generate a tabular representation of said one or more keywords and said one or more arguments, wherein said tabular representation comprises said one or more keywords and said one or more arguments arranged at a plurality of levels comprising a lowest outermost level and a highest innermost level, based on a level of said one or more keywords and said one or more arguments in a syntax of said SQL expression; and generate said S-expression tabular structure by traversing said tabular representation and grouping one or more arguments subsequent to a keyword at a level from among said plurality of levels and prior to a subsequent keyword at said level or a subsequent lower level from among said plurality of levels, wherein said grouped one or more arguments are represented as arguments of said keyword nested within a pair of parenthesis following said keyword, wherein said keyword is represented as a function with said one or more arguments, and wherein upon said subsequent keyword being at said subsequent lower level, said keyword along with said nested arguments of said level are nested within another pair of parenthesis.

15. The system of claim 9, wherein said pre-determined language is an SQL based language.

16. The system of claim 9, wherein said SQL expression comprises an SQL expression associated a definition of a dimensional model and wherein said pre-determined language comprises an expression associated with a dimensional model of a predetermined business intelligence tool.

17. A processor-implemented method comprising:

converting a SQL expression into an S-expression tabular structure, wherein said S-expression comprises a nested list;

generating a function table based on said S-expression tabular structure, wherein said function table comprises a plurality of functions associated with said S expression tabular structure tabulated against at least one of a function name, a derived column and a derived table;

generating an argument table based on said S-expression tabular structure, wherein said argument table comprises a plurality of arguments associated with said S-expression tabular structure tabulated against at least one of an argument type, a function identification, a computed from function, a reference to entity or a literal value; and converting at least one function associated with said S-expression tabular structure to a pre-determined language based on a language map of said pre-determined language and said function table and said argument table.

18. The processor-implemented method of claim 17, wherein said converting comprises:

reconstructing an S-expression string for said at least one function from a database representation; and transforming said reconstructed S-expression string for said at least one function to said pre-determined language.

19. The processor-implemented method of claim 17, wherein said reconstructing comprises:

a) selecting a function name of said at least one function from said function table and selecting at least one of an argument type, a reference to entity, a literal value, a computed from function for said at least one function from said argument table;

b) augmenting an S-expression string for said at least one function with said argument type comprising at least one of a base column, a derived column, a base table, or a derived table along with said reference to entity;

c) augmenting said S-expression string for said at least one function with said argument type comprising a literal value; and d) recursively performing steps a) to d) for said argument type comprising a computed function.

20. The processor-implemented method of claim 17, wherein said transforming comprises:

changing at least one of one or more function names, one or more arguments, a syntax and one or more keywords of each list in a reconstructed S-expression string to be in compliance with said language map of said pre-determined language.

* * * * *

UNITED STATES PATENT AND TRADEMARK OFFICE
CERTIFICATE OF CORRECTION

| | | |
|---|---|---|
| PATENT NO. | : 9,881,055 B1 | Page 1 of 2 |
| APPLICATION NO. | : 14/882207 | |
| DATED | : January 30, 2018 | |
| INVENTOR(S) | : Rahul Kapoor and Sunny Tulsi Sreedhar Murthy | |

It is certified that error appears in the above-identified patent and that said Letters Patent is hereby corrected as shown below:

On the Title Page

After item (57) abstract "20 Claims, 9 Drawing Sheets" should read --23 Claims, 9 Drawing Sheets--

In the Claims

Column 16, Line 53, add Claims 21-23 as follows:
21. The processor-implemented method of claim 20, wherein said changing comprises:
    changing an order of said one or more function names and one or more arguments in said reconstructed S-expression string; and
    changing said syntax based on said language map by at least changing or removing at least one or more argument separators and one or more function boundary identifiers.

22. The processor-implemented method of claim 17, wherein converting said SQL expression into an S-expression tabular structure comprises:
    retrieving one or more keywords and one or more arguments associated with said SQL expression;
    generating a tabular representation of said one or more keywords and said one or more arguments, wherein said tabular representation comprises said one or more keywords and said one or more arguments arranged at a plurality of levels comprising a lowest outermost level and a highest innermost level, based on a level of said one or more keywords and said one or more arguments in a syntax of said SQL expression; and
    generating said S-expression tabular structure by traversing said tabular representation and grouping one or more arguments subsequent to a keyword at a level from among said plurality of levels and prior to a subsequent keyword at said level or a subsequent lower level from among said plurality of levels,
    wherein said grouped one or more arguments are represented as arguments of said keyword nested within a pair of parenthesis following said keyword, wherein said keyword is represented as a function with said one or more arguments, and wherein upon said subsequent keyword being at said Signed and Sealed this
Twenty-sixth Day of June, 2018

Andrei Iancu
*Director of the United States Patent and Trademark Office* subsequent lower level, said keyword along with said nested arguments of said level are nested within another pair of parenthesis.

23. The processor-implemented method of claim 17, wherein said SQL expression comprises an SQL expression associated a definition of a dimensional model and wherein said pre-determined language comprises an expression associated with a dimensional model of a predetermined business intelligence tool.